Oct. 23, 1945.                W. M. HUSTON ET AL                 2,387,268
                            CRAWLER DRIVE MECHANISM
                     Filed Aug. 14, 1942          4 Sheets-Sheet 1
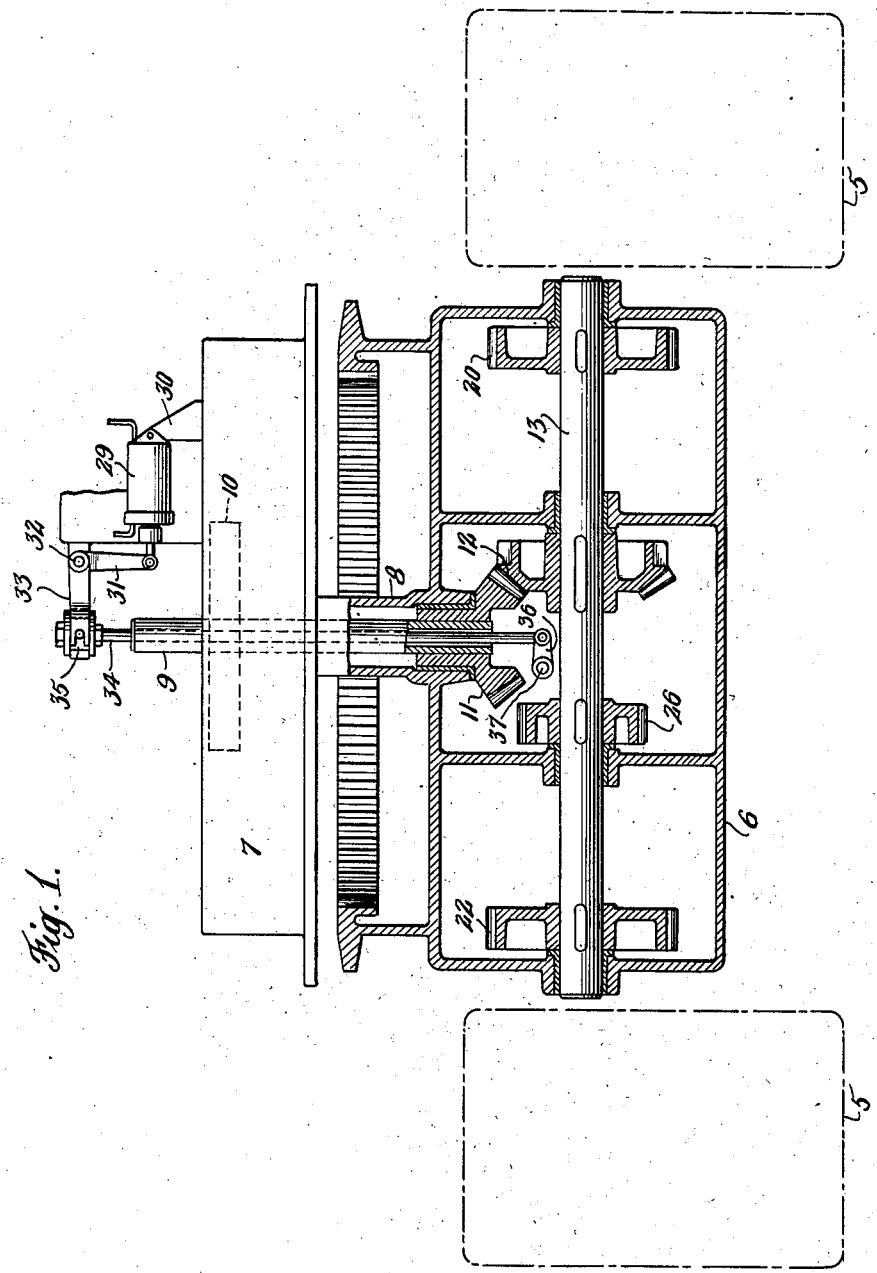
INVENTORS
William M. Huston +
BY Cecil C. Jones
ATTORNEYS

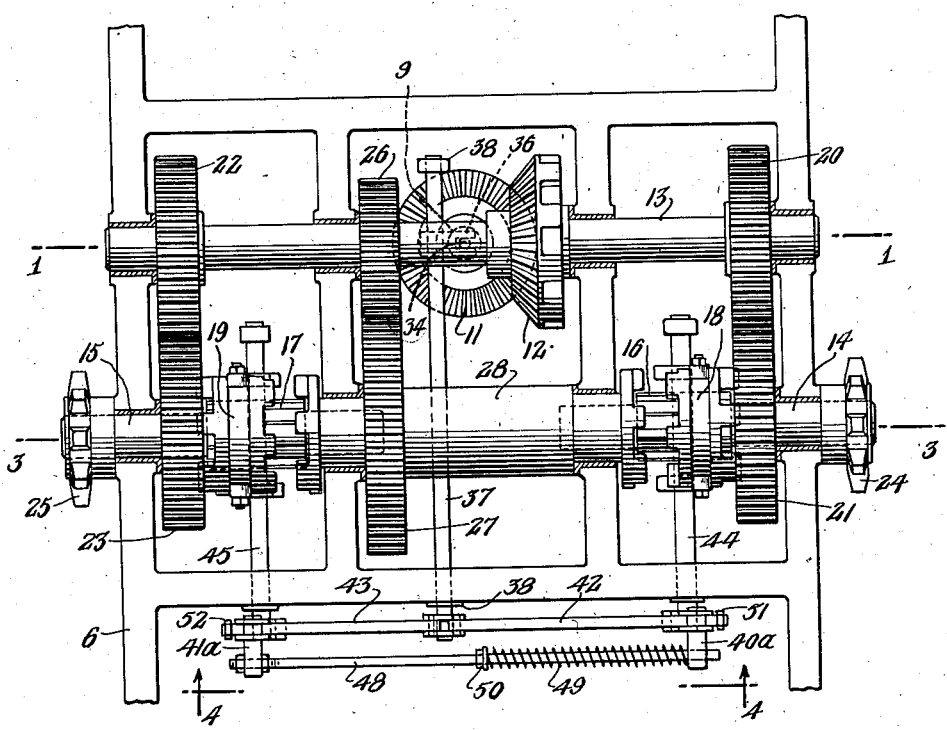

Oct. 23, 1945.  W. M. HUSTON ET AL  2,387,268
CRAWLER DRIVE MECHANISM
Filed Aug. 14, 1942  4 Sheets-Sheet 3
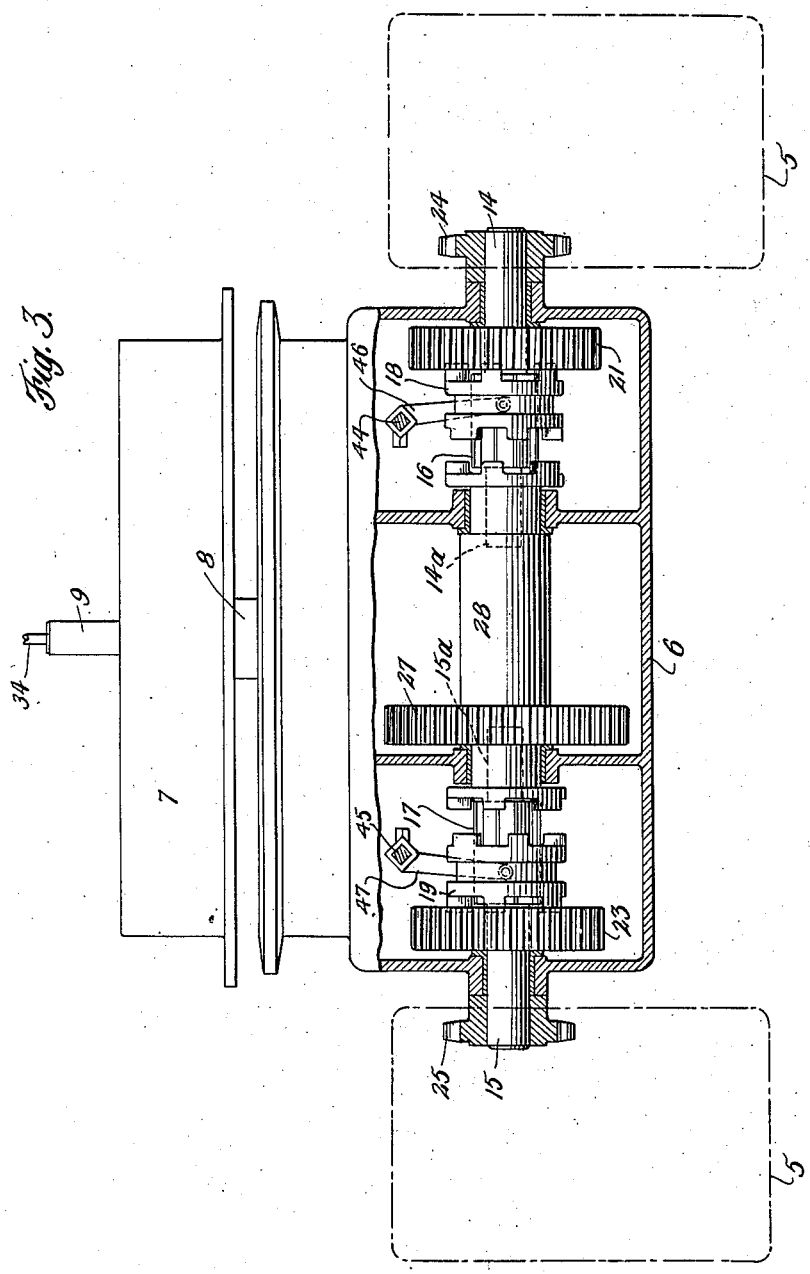
INVENTORS
William M. Huston &
Cecil E. Jones
BY
ATTORNEYS Oct. 23, 1945.    W. M. HUSTON ET AL    2,387,268
CRAWLER DRIVE MECHANISM
Filed Aug. 14, 1942    4 Sheets-Sheet 4
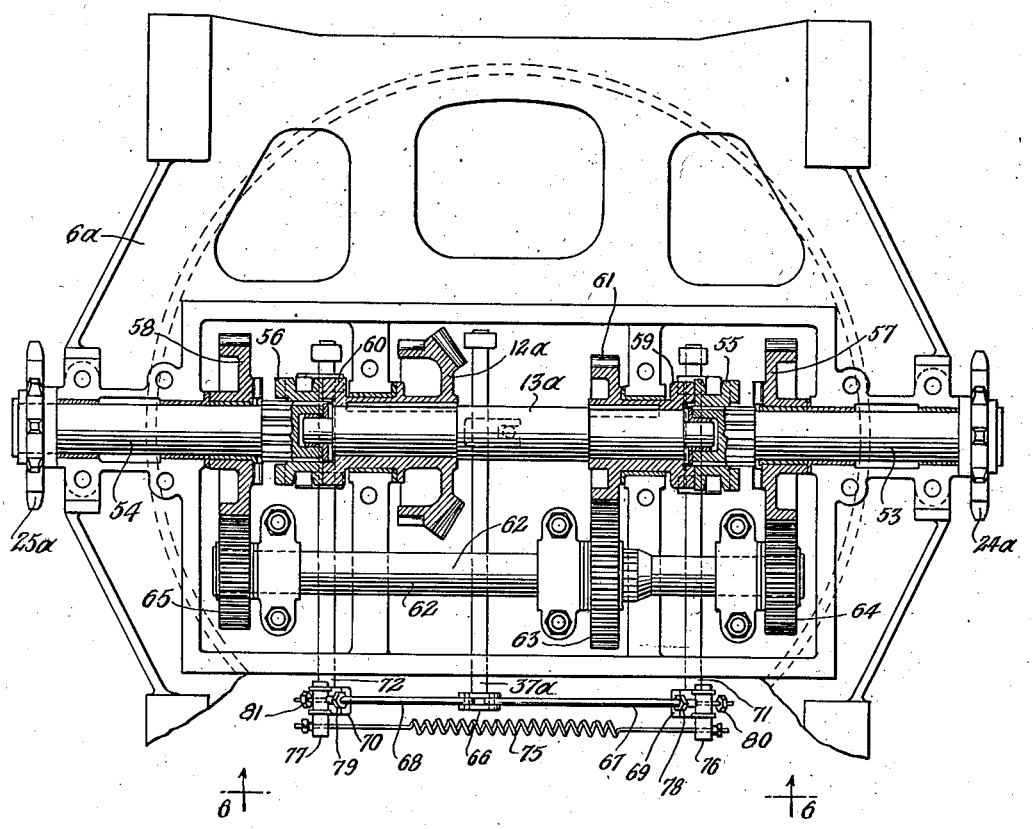
Fig. 5.
Fig. 6.
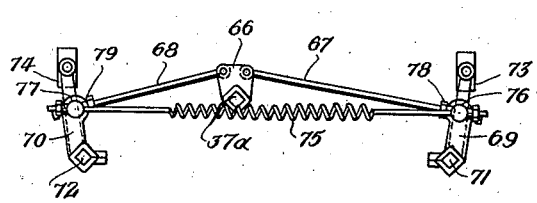
INVENTORS
William M. Huston
Cecil E. Jones
BY
ATTORNEYS Patented Oct. 23, 1945

2,387,268

UNITED STATES PATENT OFFICE 2,387,268

CRAWLER DRIVE MECHANISM

William M. Huston and Cecil E. Jones, Lima, Ohio

Application August 14, 1942, Serial No. 454,792

11 Claims. (Cl. 180—9.2)

This invention relates to drive mechanism of the type employed on self-propelling machines such as power shovels, draglines, excavators and the like.

Ordinarily, a machine of this general type includes a truck having ground-contacting drive elements, such as crawler treads, at each side thereof, the truck serving to support a rotating base on which is mounted a power unit and various devices and machinery for effecting the operations for which the machine is designed, such as hoisting, crowding, swiveling of the base, and traveling of the machine on the crawler treads.

Most commonly, a machine of this character is steered by locking one or the other of the two treads and applying power to the tread not locked, thereby causing the machine to turn to one side or the other.

Broadly, the present invention contemplates an improved drive mechanism providing for differential drive on the two treads, that is, for drive of the two treads at different rates, for steering purposes. This is of advantage since it reduces strains on various parts of the propelling mechanism, including the truck frame, the crawler treads, drive chains, etc.

Further, the invention contemplates a truck propelling arrangement, parts of which are selectively operative for steering purposes by effecting positive drive of the treads at the two sides in a predeterminedly differing speed relationship.

More specifically, the invention has in view a drive mechanism incorporating separate power transmission means for the two treads, each having the same ratio, together with a third transmission having a different ratio, provision being made for alternatively coupling the third transmission with either tread, so that one side is driven at a higher rate than the other.

According to the invention, control means are provided interrelating the operation of the several transmissions, the control providing for disconnection of the normal drive at one side when the third transmission is coupled at that side.

In the preferred construction, the third transmission has a ratio providing for a lower speed than the other two.

In connection with the above, it is to be noted that, in accordance with the invention, a total of only three transmissions or sets of gears is required to accomplish all of the propelling functions, including drive at both sides at the same rate and differential drive as between the two sides, either side being capable of drive at a higher rate than the other. In this way, provision is made for effecting the several drive functions with a minimum of gears and other parts. This is of further advantage in view of the fact that the available space in the crawler truck is relatively limited.

It is further noted that the several shafts and gears required in the drive mechanism are arranged in a novel manner, especially from the standpoint of the bearings employed, the result being an unusually compact and yet rugged construction, as will appear hereinafter.

Still further, the invention contemplates a novel form of control incorporating a fluid pressure actuable device mounted on the rotating base and a mechanical actuating connection extended from said device to controllable parts of the power transmission on the crawler truck. This fluid pressure device may be actuable either by air pressure or by hydraulic pressure, such as oil pressure. The mechanical connection is desirably arranged coaxially of the axis on which the rotating base is mounted. Moreover, the power for propelling the machine is carried from the prime mover on the rotating base to the truck through a shaft also arranged coaxially with the axis of swiveling of the base. By locating the fluid pressure device on the rotating base and employing a mechanical connection from there to the truck, all pressure connections may be made much more readily accessible than where the pressure device is mounted on the truck. Servicing, for instance, for repair of leaks, is thereby greatly simplified.

In addition to all of the above, the invention provides, in a machine of the character described, a driving and steering mechanism characterized by compactness, adequate clearances between and accessibility of parts, simplification of structure, minimization of first cost, reduction of wear, and thus of maintenance and repair costs by reduction of the number of gears and other moving parts operating during propelling and/or steering, minimization of friction, thus saving engine power, improvement of the support for bearings, clutches and other parts, and an increase in ruggedness of the arrangement.

How the foregoing objects and advantages are attained will appear more fully from the following description referring to the accompanying drawings, which illustrate two forms of construction, and in which—

Figure 1 is a transverse vertical sectional view of one form, illustrating portions of a crawler truck, and showing in elevation the outline of the rotating base mounted on the truck, together with drive parts arranged in accordance with the invention, this view being taken in the vertical plane indicated by the line 1—1 on Figure 2;

Figure 2 is a view illustrating drive mechanism in the truck, the view being taken from the bottom;

Figure 3 is a transverse sectional view taken in the vertical plane indicated by the line 3—3 on Figure 2;

Figure 4 is a fragmentary view of certain details taken as indicated by the line 4—4 on Figure 2; and Figures 5 and 6 are views similar to Figures 2 and 4, illustrating a second form of construction.

As indicated in Figures 1 and 3, the machine is adapted to rest on and travel on the ground on a pair of crawler treads 5—5. The crawler truck 6 is associated with the treads and the rotating base 7 is mounted on the truck by means of the center pin 8 about which the base may turn. The base serves to support machinery, including a prime mover, for the purpose of effecting the operations for which the machine is designed.

Power is adapted to be delivered to the usual crawler tread sprockets (not shown) through drive mechanism now to be described. A vertical shaft 9 extends through the center pin mounting, the upper end of the shaft being provided with a gear 10 adapted to be coupled to the prime mover on the rotating base in a manner well understood in this art, the coupling ordinarily including a controllable clutch.

At its lower end, the vertical shaft 9 carries a bevel gear 11 meshing with gear 12, which latter is keyed on the travel shaft 13 which extends transversely of and is journaled in the truck frame structure.

Right-hand and left-hand shafts 14 and 15 are also journaled in the truck frame, these two shafts being positioned in alignment with each other, as clearly appears in Figures 2 and 3, and being somewhat offset from transverse shaft 13. Shafts 14 and 15 are provided with splined sections 16 and 17 on which are mounted the clutch devices 18 and 19.

Power is adapted to be transmitted from shaft 13 to shaft 14 through a pair of gears 20 and 21, the former of which is fixed on shaft 13 and the latter of which is freely rotative on shaft 14. Gear 21, however, is provided with jaw clutch projections cooperating with complementary parts formed on clutch 18, so that upon interengagement of these parts, shaft 14 is caused to rotate with gear 21.

At the other side of the machine a similar set of gears 22 and 23 is arranged, the clutch 19 serving to connect gear 23 with shaft 15.

The two shafts 14 and 15 are provided with sprockets 24 and 25, each adapted to be coupled by means of a chain with the sprocket for the tread at that side of the machine, in a manner understood in this art.

The foregoing drive mechanism serves to transmit power from the prime mover on the rotating base to the two crawler treads, and since the sets of gears 20—21 and 22—23 are of the same ratio, this drive will actuate the two tread driving sprockets at the same rate, thereby effecting straight-line travel of the machine.

In accordance with the present invention provision is made for an alternative condition of drive in which either one of the tread sprockets is driven at a lower rate than for normal straight-line travel. For this purpose, a third set of gears 26 and 27 is employed, the gear 26 being keyed to transverse travel shaft 13 and gear 27 being carried by a shaft 28 journaled in the truck frame intermediate the pair of shafts 14 and 15. As best seen in Figure 3, the adjacent ends of the three aligned shafts (14, 28 and 15) are desirably journaled with reduced inner end portions 14a and 15a extended into the two ends of shaft 28, the ends of shaft 28, in turn, being exteriorly journaled in the truck framing. This provides a rugged and yet compact bearing arrangement.

The two ends of shaft 28 are further provided with jaw clutch parts adapted to cooperate with complementary parts formed on the clutch devices 18 and 19. Thus, when clutch 18 is moved inwardly, gear 21 is disconnected from shaft 14 and gear 27 is engaged and, on the other hand, when clutch 19 is moved inwardly, gear 23 is disengaged from shaft 15 and gear 27 is coupled therewith.

The foregoing mechanism, therefore, provides for positive drive at the two sides of the machine at different rates, so that the machine can be turned in one direction or the other. As above noted, this is of advantage since it reduces strain on various of the driving parts, including the treads themselves, drive chains, truck frame, etc., as compared with an arrangement such as commonly employed in the prior art where turning is effected by positively locking one or the other of the treads.

According to the invention, the control for the clutches 18 and 19 preferably comprises a mechanical connection from the truck to the rotating base, at which point the mechanical connection is desirably actuated by a fluid pressure power device. Thus, in Figure 1, a double-acting fluid pressure piston and cylinder device appears at 29, it being understood that suitable fluid pressure supply lines (fragmentarily shown) are associated with the cylinder, so as to introduce and exhaust pressure fluid (for instance, air or oil), as by means of any convenient operator's control valve. The cylinder is mounted by bracket 30 on the rotating base and the piston is coupled with one arm 31 of a bell crank pivoted at 32, the other arm 33 of this bell crank being bifurcated to embrace control rod 34. A joint 35 of known type permits free relative rotation of arm 33 of the bell crank with respect to control rod 34, while at the same time providing for transmission of up and down control movements to said control rod.

The control rod passes downwardly through the vertical drive shaft 9, the lower end being connected with an arm 36 which is fixed on shaft 37. Upward and downward movement of the control rod 34 thus causes the shaft 37 to oscillate in its bearings indicated at 38 in Figure 2.

As best seen in Figure 4, shaft 37 has a squared end carrying another arm 39 which is connected with short arms 40 and 41 by means of links 42 and 43, arms 40 and 41 being fixed on shafts 44 and 45. Shafts 44 and 45 are appropriately journaled in the truck frame and carry bifurcated clutch shifter arms 46 and 47. Arms 46 and 47 cooperate, respectively, with clutches 18 and 19, serving to effect sliding movement of these clutches on their spline mountings 16 and 17. In considering the parts just mentioned, it may be noted that since Figure 2 is a bottom view, the parts appear in inverted positions in Figure 4. Actually control shafts 44 and 45 lie above the transmission shafts, as is shown in Figure 3, and the shifter arms 46 and 47 extend downwardly to cooperate with the clutches.

For the purpose of maintaining the two clutches in their outer positions (in which gear sets 20—21 and 22—23 are in operation) a transverse rod 48 extends between arms 40 and 41 being connected therewith by pins 40a and 41a. One end of rod 48 has a freely sliding mounting in pin 40a and a compression spring 49 reacts against this pair and also against an abutment 50 carried by the rod 48. The opposite end of rod 48 is fixed in pin 41a, both pins, however, being rotatively mounted in the arms to accommodate control movements. The net result of the spring is to urge the two arms 40 and 41 away from each other, and this normally maintains the clutches 18 and 19 in their outer positions, shown in Figures 2 and 3.

Before considering the operation of the control mechanism, it should further be noted that links 42 and 43 also have a sliding fit with arms 40 and 41, although each link is provided with an abutment at its outer end, such as indicated at 51 and 52, through which the associated arm may be pulled inwardly.

In the normal or mid-position of adjustment of the control, which is the position illustrated in the figures, spring 49, as aforesaid, maintains the two clutches in their outer positions, and in this condition the drive is at the same rate at the two sides of the machine, so that straight-line travel is effected.

Upward or downward movement of the control rod 34, by actuating the fluid pressure device 29, causes one or the other of links 42 and 43 to operate the clutch at that side of the machine. For instance, assume downward movement of control rod 34. This will cause arm 39 on shaft 37 to rock to the right when viewed as in Figure 4. Abutment 52 on link 43 now engages arm 41 and causes this arm to rock, also toward the right, thereby producing a similar movement of clutch shifter arm 47, so that clutch 19 is disengaged from gear 23 and engaged with gear 27. At the same time, the movement of link 42 at the other side of the mechanism merely results in a sliding of this link with respect to arm 40, so that clutch 18 remains in its normal position in which gear 21 is coupled with shaft 14. The slipjoint at the right-hand end of rod 48 (as viewed in Figure 4) prevents this rod from interfering with the described movement of arm 41. Compression spring 49, under the conditions described above, is merely slightly compressed and still remains operative to maintain clutch 18 in its position of engagement with gear 21.

Similar action takes place upon upward movement of the control rod 34, although at this time clutch 18 is shifted to the left so as to disconnect gear 21 and connect gear 27 with shaft 14, clutch 19 remaining in engagement with gear 23.

From the foregoing it will be seen that the invention provides for drive at both sides of the machine at the same rate, or for employment of a different rate of drive at the two sides, the control being effected by the operator normally stationed in the cab on the rotating base.

The control system is of advantage from a number of standpoints, it being of especial importance that a mechanical actuating connection is utilized from the truck to the rotating base, and the pressure power operating means is mounted on the rotating base, being coupled with the mechanical connection at that point. This avoids the necessity for taking pressure connections through the center pin mounting into the truck.

Various of the advantages above enumerated are also secured by the modified construction illustrated in Figures 5 and 6.

In the form of Figures 5 and 6, the truck frame is indicated at 6a, the travel shaft 13a being journaled in the truck frame as in the form first described. Bevel gear 12a is adapted to mesh with a complementary gear mounted on the vertical shaft (not shown) through which power is transmitted from the power plant on the rotating base to the drive mechanism in the truck frame. Shaft 13a, in the form of Figures 5 and 6, is relatively short, but is arranged in alignment with additional shafts 53 and 54 carrying sprockets 24a and 25a adapted to cooperate with chains through which the driving power is transmitted to the tread sprockets.

Shaft 53 carries a clutch device 55, the clutch being splined to the shaft. A similar clutch device 56 is splined on shaft 54. In addition shafts 53 and 54 carry spur gears 57 and 58, respectively, which spur gears are freely rotatable on the shafts, but are adapted to be locked to the shafts through the clutches 55 and 56, the pairs of gears and clutches having complementary clutch teeth as shown in Figure 5. The clutch devices 55 and 56 are further adapted to cooperate with clutch teeth formed on parts 59 and 60, the former being formed with gear 61 which is fixed on shaft 13a, and the latter being formed with gear 12a which is also fixed on shaft 13a.

When the two clutches (55 and 56) are both moved inwardly, shafts 53 and 54 are directly connected with shaft 13a, thereby transmitting power in the same ratio to the two sprockets 24a and 25a.

Drive of the tread at one side, or the other, at a lower rate is provided for by the mechanism described just below.

A supplemental shaft 62 arranged parallel to shafts 13a, 53 and 53 has fixed thereon a gear 63 meshing with gear 61, and also a pair of gears 64 and 65 meshing respectively with gears 57 and 58.

When one of the clutches (for instance 55) is moved outwardly, the gear at that side (57) is connected with shaft 53, in view of which the drive at that side of the machine then takes place from shaft 13a through gears 61 and 63 to shaft 62, and from there through gears 64 and 57 to shaft 53. Since gear 64 is smaller than gear 57, this series of drive connections provides for a lower rate of drive than is provided by the direct coupling of shaft 13a to shaft 53 through clutch 55. The tread at the other side may similarly be driven at a lower rate by outward movement of clutch 56.

When clutches 55 and 56 are in the inner positions, gears 61, 63, 64, 65, 57 and 58 merely idle.

The foregoing construction provides low-loss transmission of power during straight-ahead propel (both treads driven at the same rate), since this drive need not be carried through any pairs of gears in the truck frame.

The location of the several shafts and gears above described is also of importance since the arrangement is very compact and further since the disposition of the several parts makes possible better bearing supports for the sprockets 24a and 25a. Still further, this arrangement is of advantage since more room is provided for the axles and other parts between the propel chains. These points are of especial importance for the reason that the available space in the truck is relatively limited.

The control mechanism for operating clutches 55 and 56 is similar to that described above in connection with Figures 1 to 4 inclusive. However, since the clutches operate in the opposite senses from the arrangement of Figures 1 to 4, a slight re-arrangement of control parts is required, as will appear just below.

The main horizontal control shaft is adapted to be actuated from the rotating base in the same manner as described above. This shaft (37a) carries an arm 66 coupled by means of links 67 and 68 with arms 69 and 70, the latter being mounted on shafts 71 and 72 which are apropriately journaled in the truck frame as before. Shafts 71 and 72 again carry shifter arms 73 and 74 cooperating respectively with clutches 55 and 56.

Tension spring 75 interconnects pins 76 and 77 which are rotatively mounted on the short arms 69 and 70. This tension spring normally urges the shifter arms toward each other and thus normally maintains the clutches 55 and 56 in their inner positions. When it is desired to move one of the clutches (55 or 56) outwardly, the control shaft 37a is actuated (from the manual control on the rotating base) so as to rock arm 66 to one side or the other, thereby moving one or the other of arms 69 and 70 outwardly. For this purpose links 67 and 68 carry abutments 78 and 79. The end portions of links 67 and 68 are also slidable in apertures through pins 76 and 77, and toward the extremity of each link another abutment is provided (80 and 81), this abutment being spaced so as to permit free movement of the arm 66 in either direction from its mid-position in order to move either of clutches 55 and 56 outwardly. These outer abutments (80 and 81) will also serve to insure that one clutch or the other is always retained in its inner position.

With regard to both forms of construction above described, it is particularly to be noted that only relatively few (6) gears are required in providing capability of driving both treads at the same rate, or either tread, selectively, at a lower rate.

This arrangement obviously simplifies and lowers the cost of the propelling and steering mechanism, reduces friction losses, wear, maintenance, etc., gives greater accessibility of parts, and simplifies repairs. Additionally, in the second form, there is a further reduction in friction and wear, since the straight ahead propelling operation takes the driving load off of six of the spur gears.

Other advantages of the invention will be obvious to those skilled in the art, and it will also be apparent that various changes, alternatives, omissions and additions may be adopted, within the scope of the invention as disclosed and as defined in the claims.

We claim:

1. In a machine adapted to travel on a pair of crawler treads, said machine having a crawler truck, a rotating base mounted on said truck, and a power unit carried by the rotating base, drive mechanism for said crawler treads including a vertical shaft driven by said power unit and extended downwardly from the rotating base to the crawler truck, a transverse shaft mounted in the truck and geared to said vertical shaft to be driven therefrom, right-hand and left-hand shafts adapted respectively to drive the right- and left-hand treads, the right- and left-hand shafts being mounted in alignment with the transverse shaft, disconnectible clutches for coupling the right- and left-hand shafts with said transverse shaft to provide for drive of the two treads at the same rate, and a disconnectible power transmission connected with the transverse shaft having a different drive ratio and being adapted to be coupled with either of said right- and left-hand shafts.

2. A construction in accordance with claim 1 in which the drive through said power transmission is at a lower rate than through said clutches.

3. A construction in accordance with claim 1 in which said power transmission includes a shaft offset from the first shafts and disconnectible gearing for selectively coupling said offset shaft with either of said right- and left-hand shafts.

4. A construction in accordance with claim 1 in which said power transmission includes a shaft offset from the first shaft and disconnectible gearing for selectively coupling said offset shaft with either of said right- and left-hand shafts, said gearing being in constant mesh but having disconnection means arranged to relieve it of the driving load.

5. A construction in accordance with claim 1 and further including means normally urging the disconnectible clutches toward positions in which the right- and left-hand shafts are connected with the transverse shaft.

6. A construction in accordance with claim 1 and further including means normally urging the disconnectible clutches toward positions in which the right- and left-hand shafts are connected with the transverse shaft, and controllable means for actuating the clutches providing for alternative disconnection of the right- and left-hand shafts from the transverse shaft and for connection of said disconnectible power transmission to that one of the right- and left-hand shafts which is disconnected from the transverse shaft.

7. A construction in accordance with claim 1 and further including controllable means for actuating the clutches and providing for alternative disconnection of the right- and left-hand shafts from the transverse shaft and for connection of said disconnectible power transmission to that one of the right- and left-hand shafts which is disconnected from the transverse shaft.

8. A construction in accordance with claim 1 in which the tread drive through the disconnectible power transmission is at a lower rate than that provided by connection of the right- and left-hand shafts through the disconnectible clutches, the construction further including controllable means for actuating the clutches providing for alternative disconnection of the right- and left-hand shafts from the transverse shaft and for connection of said disconnectible power transmission to that one of the right- and left-hand shafts which is disconnected from the transverse shaft.

9. A construction in accordance with claim 1 in which the said power transmission includes a shaft offset from the first shafts, a set of gears interconnecting the offset shaft and the transverse shaft, and independently controllable disconnectible sets of gears for respectively connecting the right- and left-hand shafts with said offset shaft.

10. A construction in accordance with claim 1 in which the said power transmission includes a shaft offset from the first shafts, a set of gears interconnecting the offset shaft and the transverse shaft, and independently controllable disconnectible sets of gears for respectively connecting the right- and left-hand shafts with said offset shaft, the disconnectible clutches being provided with means serving to effect connection and disconnection of said disconnectible sets of gears.

11. A construction in accordance with claim 1 in which the said power transmission includes a shaft offset from the first shafts, a set of gears interconnecting the offset shaft and the transverse shaft, and independently controllable disconnectible sets of gears for respectively connecting the right- and left-hand shafts with said offset shaft, the disconnectible clutches being provided with means serving to effect connection and disconnection of said disconnectible sets of gears, together with controllable means for actuating the clutches providing for alternative disconnection of the right- and left-hand shafts from the transverse shaft and for connection of the set of disconnectible gears at the right- or left-hand side according to which of the right- and left-hand shafts is disconnected from the transverse shaft.

WILLIAM M. HUSTON.
CECIL E. JONES.